Figure 1:
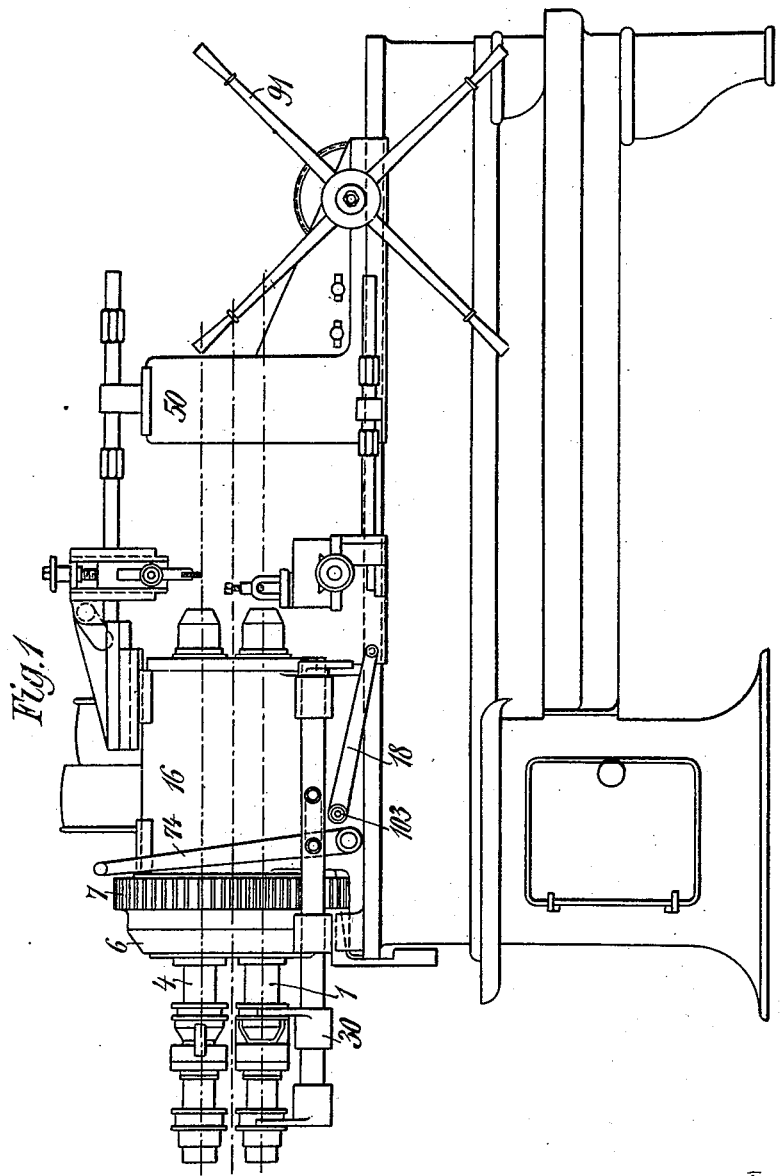

No. 694,277. Patented Feb. 25, 1902.
F. HIRSCH.
MULTIPLE SPINDLE LATHE.
(Application filed Dec. 3, 1900.)
(No Model.) 11 Sheets—Sheet 1.

Witnesses:
Edward Thorpe

Inventor
Frank Hirsch
By
Attys.

No. 694,277. Patented Feb. 25, 1902.
F. HIRSCH.
MULTIPLE SPINDLE LATHE.
(Application filed Dec. 3, 1900.)
(No Model.) 11 Sheets—Sheet 2.
Fig. 2
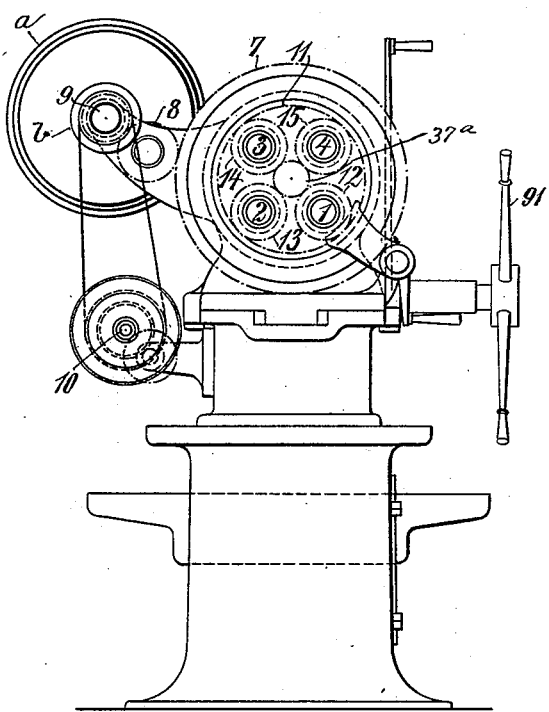
Witnesses:
Inventor:
Frank Hirsch
By 
Attys.

No. 694,277. Patented Feb. 25, 1902.
F. HIRSCH.
MULTIPLE SPINDLE LATHE.
(Application filed Dec. 3, 1900.)
(No Model.) 11 Sheets—Sheet 3.
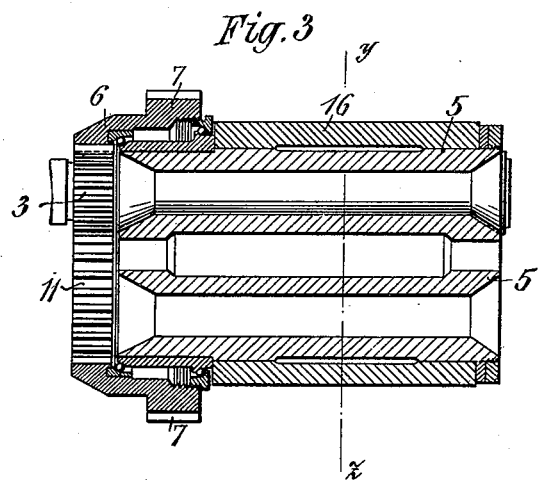
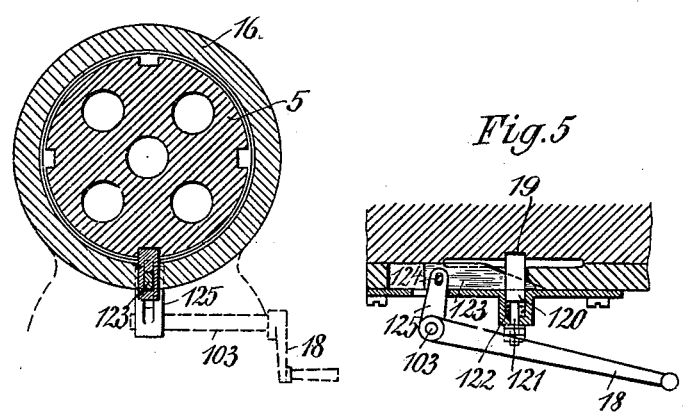
Witnesses:
Edward Thorpe
John Lotka
Inventor
Frank Hirsch
By Munn
Attys No. 694,277. Patented Feb. 25, 1902.
F. HIRSCH.
MULTIPLE SPINDLE LATHE.
(Application filed Dec. 3, 1900.)
(No Model.) 11 Sheets—Sheet 4.
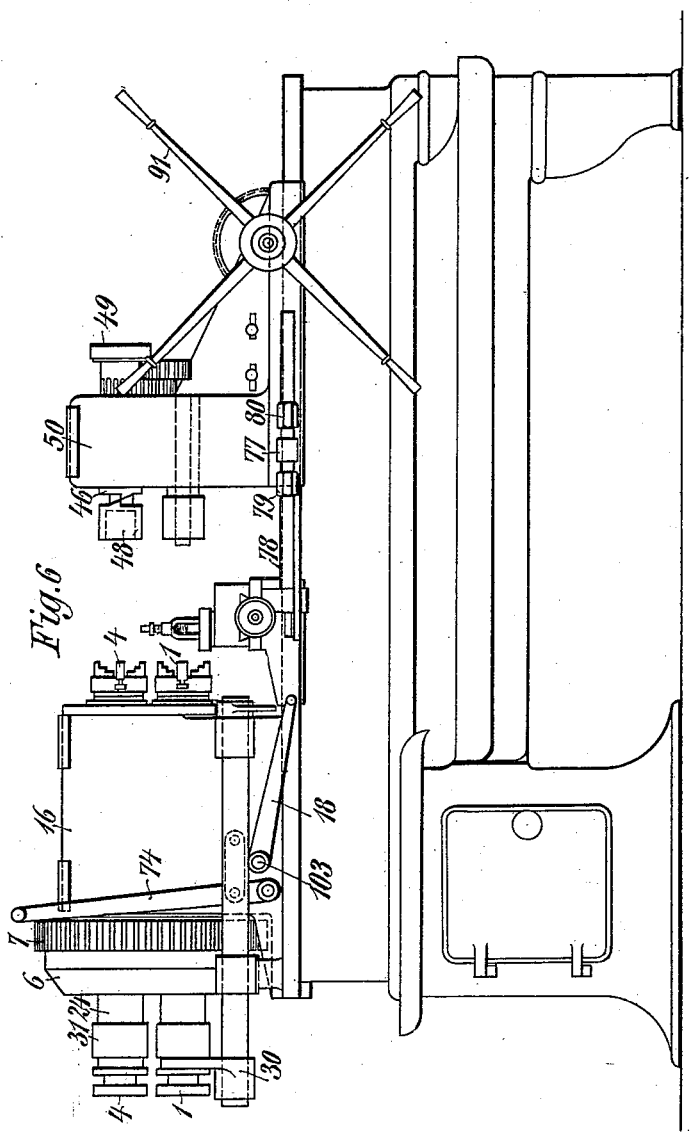
Witnesses:
Edward Thorpe
John Lotka
Inventor:
Frank Hirsch
By
Attys.

No. 694,277. Patented Feb. 25, 1902.
F. HIRSCH.
MULTIPLE SPINDLE LATHE.
(Application filed Dec. 3, 1900.)
(No Model.) 11 Sheets—Sheet 5.
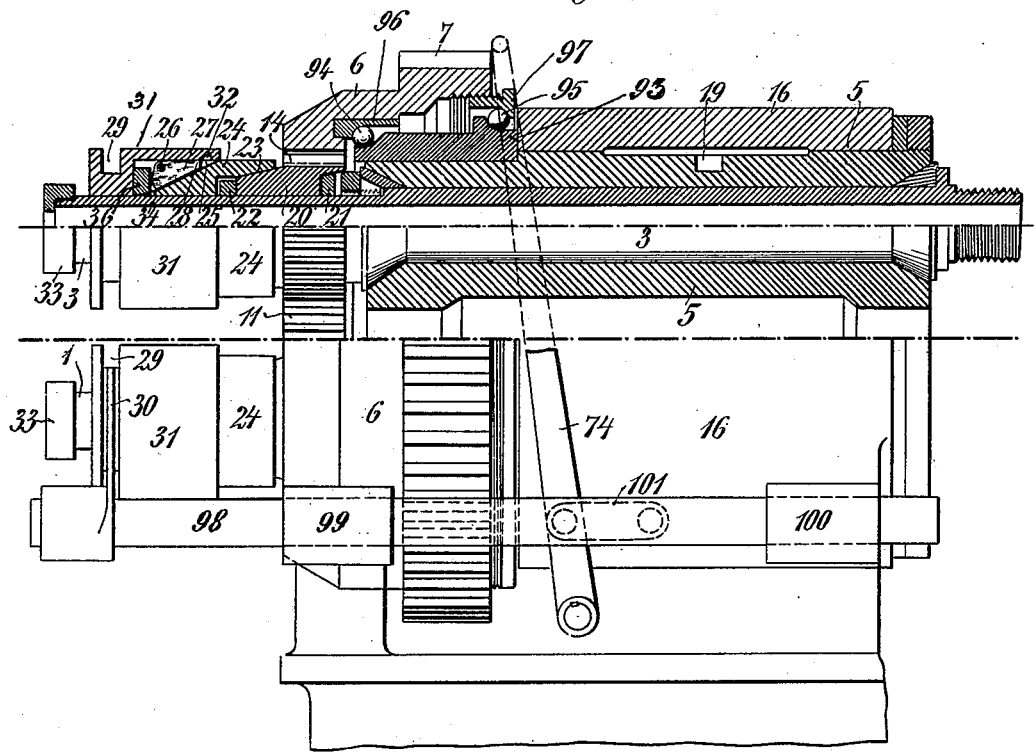
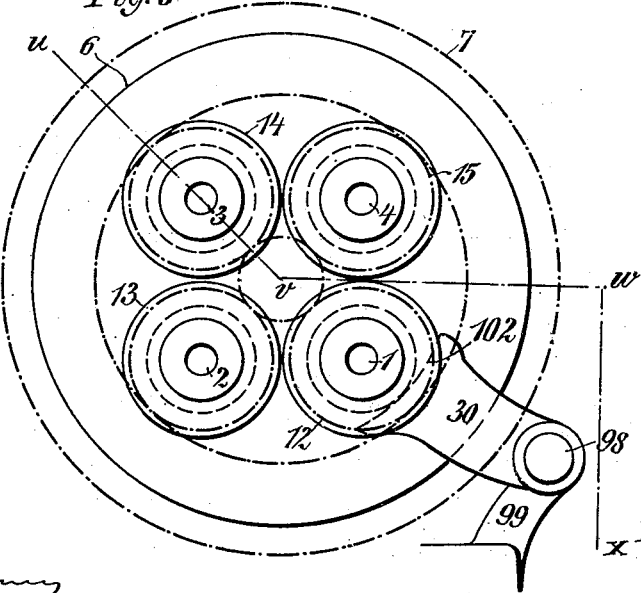
Witnesses:
John Lotka
Geo Lehmy
Inventor:
Frank Hirsch
By
Attys.

No. 694,277. Patented Feb. 25, 1902.
F. HIRSCH.
MULTIPLE SPINDLE LATHE.
(Application filed Dec. 3, 1900.)
(No Model.) 11 Sheets—Sheet 6.
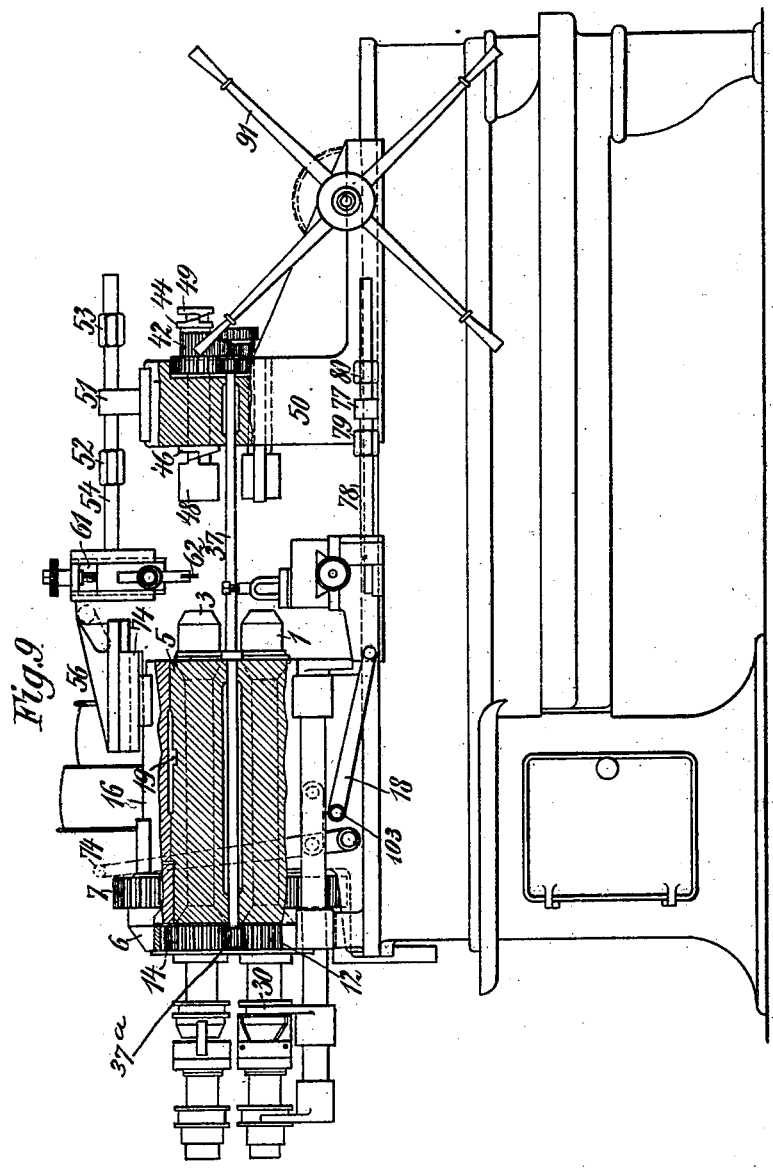
Witnesses:
Edward Thorpe
John Locke
Inventor:
Frank Hirsch
By [signature]
Attys.

No. 694,277. Patented Feb. 25, 1902.
F. HIRSCH.
MULTIPLE SPINDLE LATHE.
(Application filed Dec. 3, 1900.)
(No Model.) 11 Sheets—Sheet 7.
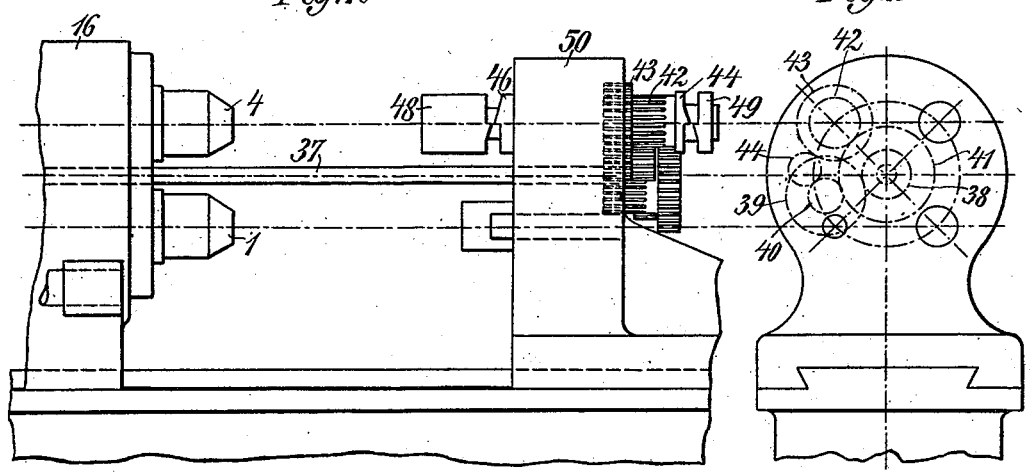
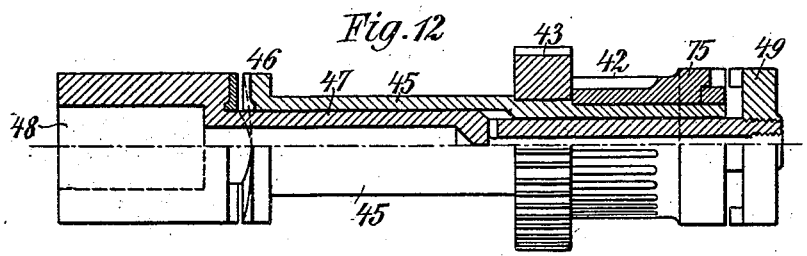
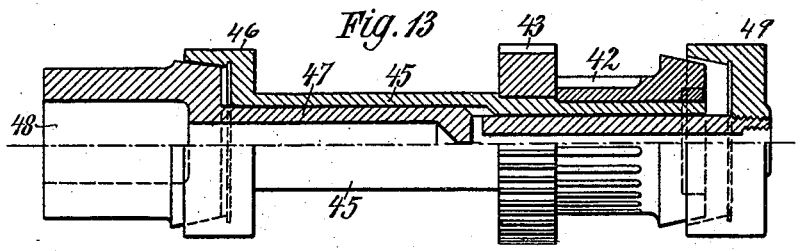
Witnesses.
John Lotka
Geo. C. Shumey
Inventor:
Frank Hirsch
By Munn
Atty.
THE NORRIS PETERS CO., PHOTO-LITHO., WASHINGTON, D. C.

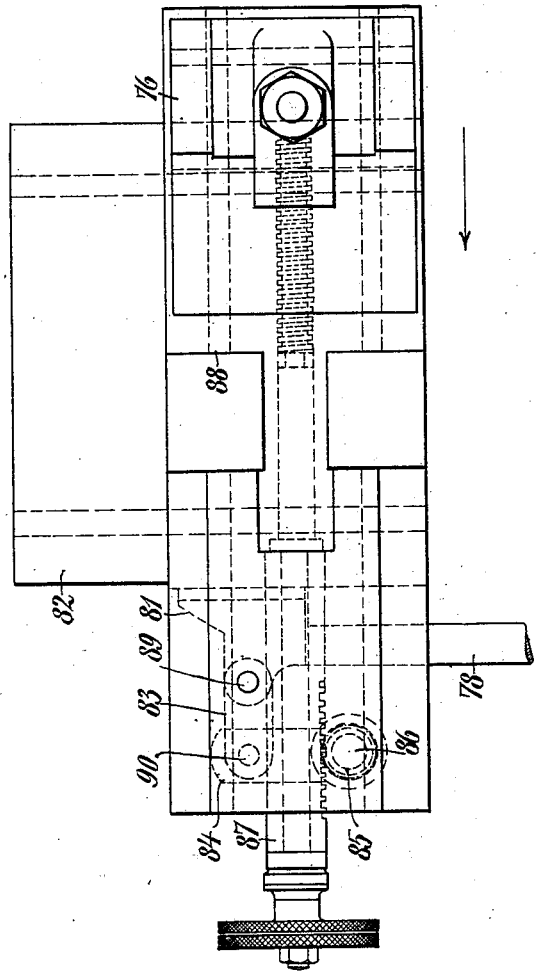

No. 694,277. Patented Feb. 25, 1902.
F. HIRSCH.
MULTIPLE SPINDLE LATHE.
(Application filed Dec. 3, 1900.)
(No Model.) 11 Sheets—Sheet 9.
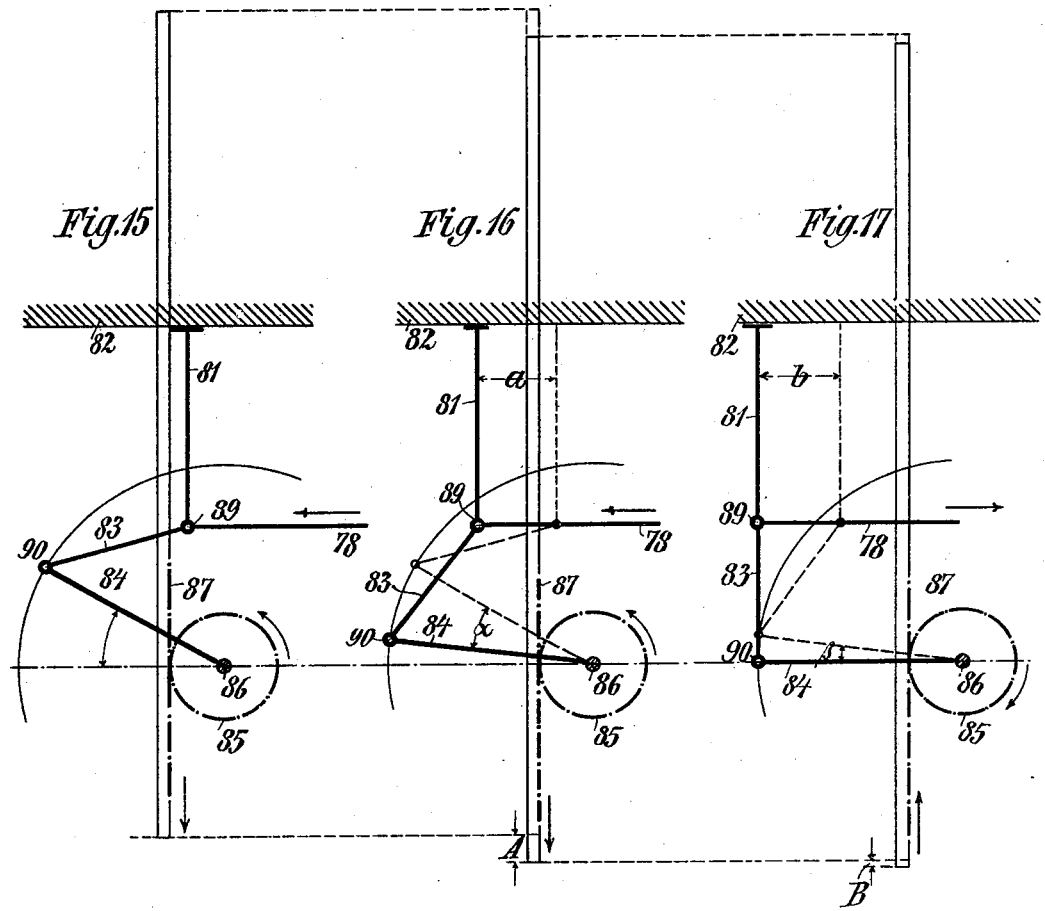

No. 694,277. Patented Feb. 25, 1902.
F. HIRSCH.
MULTIPLE SPINDLE LATHE.
(Application filed Dec. 3, 1900.)

(No Model.) 11 Sheets—Sheet 10.

Witnesses: Inventor
Frank Hirsch
By
Attys.

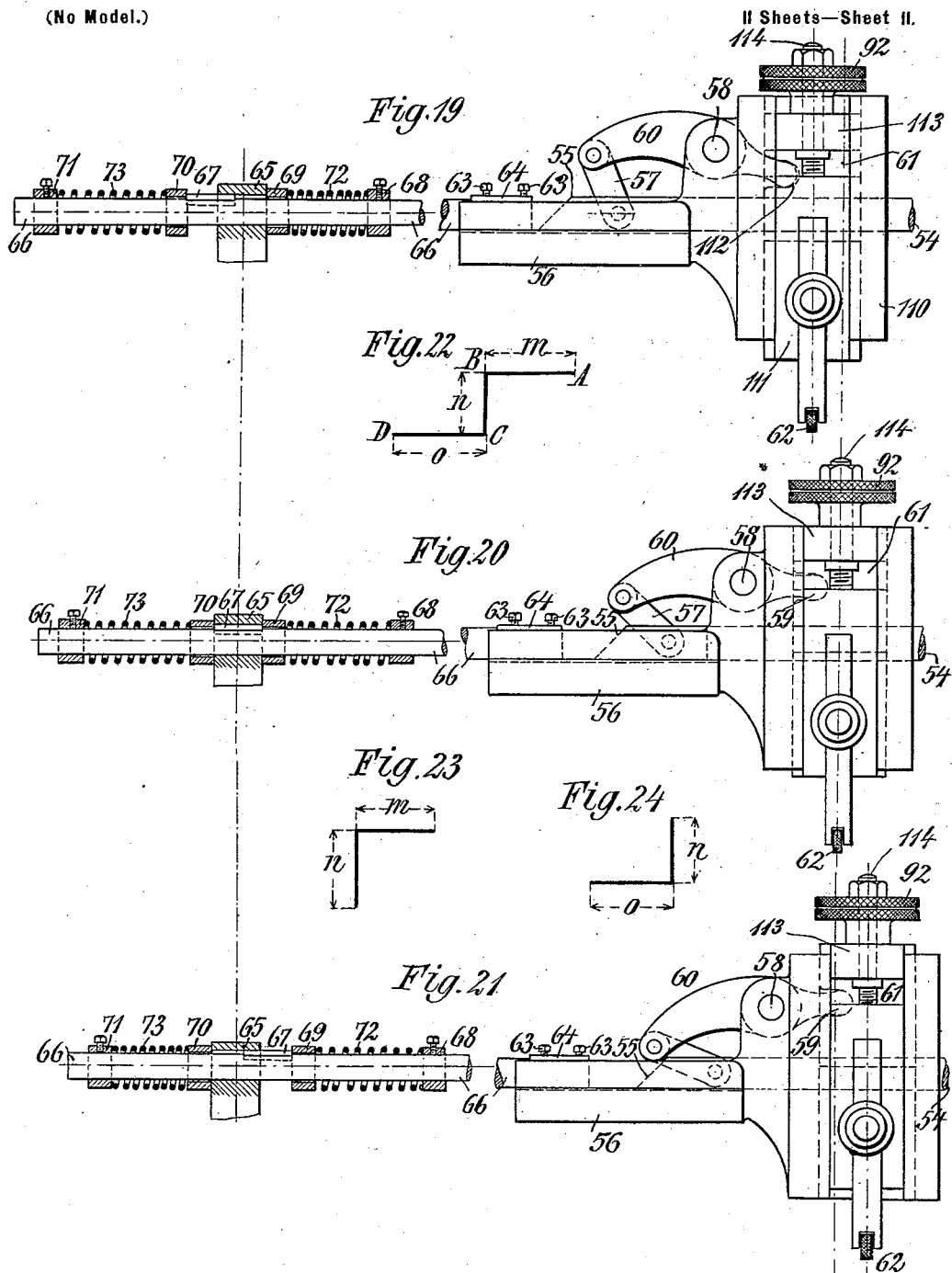

UNITED STATES PATENT OFFICE.

FRANK HIRSCH, OF STOCKHOLM, SWEDEN, ASSIGNOR TO AKTIEBOLAGET VERKTYGSMASKINER, OF STOCKHOLM, SWEDEN, A LIMITED LIABILITY COMPANY.

MULTIPLE-SPINDLE LATHE.

SPECIFICATION forming part of Letters Patent No. 694,277, dated February 25, 1902.

Application filed December 3, 1900. Serial No. 38,537. (No model.)

*To all whom it may concern:*

Be it known that I, FRANK HIRSCH, a subject of the King of Sweden and Norway, and a resident of Stockholm, in the Kingdom of Sweden, have invented certain new and useful Improvements in Multiple-Spindle Lathes for the Production in Large Quantities of Screws, Capstan-Work, and the Like, of which the following is a specification.

The head-stock is provided with a horizontal drum carrying a plurality of chuck-spindles, and the lengthwise-moving slide-rest is provided with a plurality of horizontal tool-spindles in the direction of and in opposition to the chuck-spindles, while beside the said lengthwise-moving slide-rest a number of tools adjustable in a direction on at right angles thereto are also employed.

The invention comprises several improvements which all contrive to adapt the multiple-spindle lathe for the purpose named.

The first improvement consists in the arrangement for driving the several chuck-spindles arranged around and parallel to a horizontal axis by means of a gear-wheel having internal teeth and surrounding the said spindles. The arrangement is made that the revolving drum or casing carrying the chuck-spindles may be stopped and held in this position independently of the chuck-spindles revolving around their own axes. On again releasing the drum it will revolve with the chuck-spindles around its own axis.

A further improvement consists in a device for stopping the chuck-spindles for the purpose of taking the finished work-piece off one of them and replacing it with a fresh piece during the uninterrupted revolution of the remaining chuck-spindles. The device is so arranged that always only the particular chuck-spindle it is desired to stop is disengaged from the driving-gear for taking off the finished piece, replacing it with a fresh piece.

Another improvement consists in an arrangement for screw-cutting which is so actuated by the driving-gear of the chuck-spindles that the screw-cutting tool during the revolution of the chuck-spindles at a uniform speed and in one direction is revolved by the said driving-gear in the same direction, but at a less speed during the screw-cutting, while it is driven in the same direction at an increased speed during its withdrawal by means of a new gear device, which is automatically brought into operation.

Another improvement consists in an arrangement by which the lengthwise motion of the slide-rest is transmitted by means of levers and the like to one or several tool slide-rests arranged to move in direction at right angles to the drum-axis. This transmission of the motion may be attained in several manners. In one mode of execution this is done by constantly diminishing or increasing the speed of the feed of the cross tool slide-rests. In another mode of execution the cross slide-rests are so connected with the lengthwise-moving tool slide-rest that during the constant feed of the latter the former are first moved forward and withdrawn. The one cross tool-slide may be actuated by the lengthwise-moving tool slide-rest that it is moved automatically in several directions—viz., first parallel with the said tool slide-rest, then across, and afterward again lengthwise.

My invention is illustrated by the accompanying drawings, in which—

Figure 18:
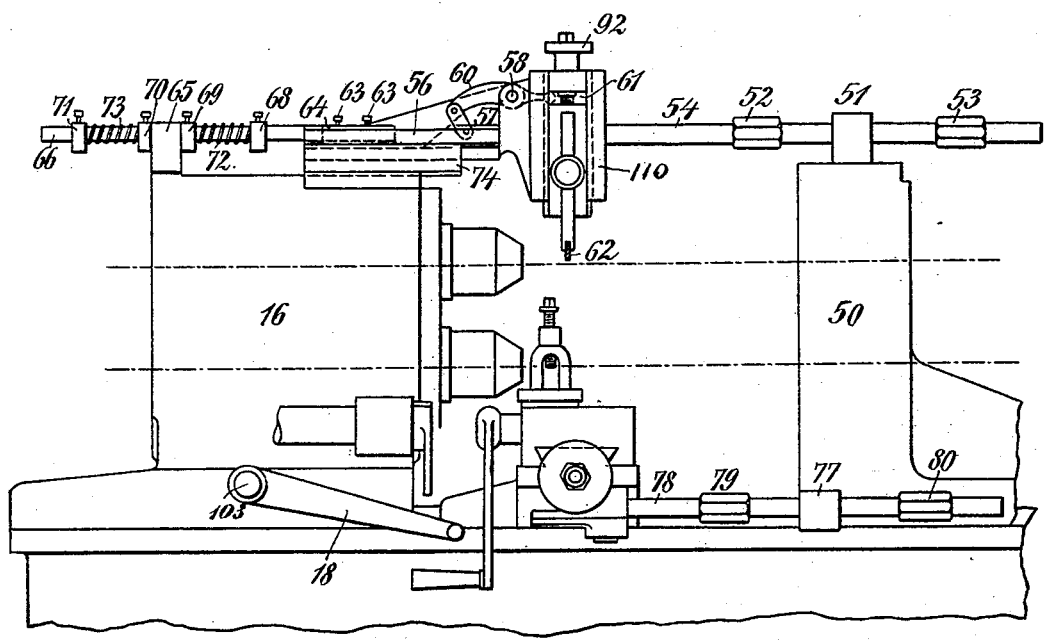

Figure 1 is an elevation of a multiple-spindle lathe with a stock-feeding device on the left hand. Fig. 2 is an end view of same, taken from the left-hand side in Fig. 1, in which the gear for driving the chuck-spindles is shown. Fig. 3 is a vertical longitudinal section, on an enlarged scale, of the drum carrying the chuck-spindles. Fig. 4 is a cross-section of the same on the line *y z* in Fig. 3. Fig. 5 shows a detail, which will be referred to later on. Fig. 6 is an elevation of a multiple-spindle lathe in which the stock-feeding device shown in Fig. 1 on the left side is omitted and in which the device for engaging and disengaging the chuck-spindles is shown. Fig. 7 shows the head-stock of the same on an enlarged scale and partly in a vertical longitudinal view, partly in an elevation on the line *u v w x* in Fig. 8. Fig. 8 is an end view, same taken from the left-hand side of Fig. 7. Fig. 9 is an elevation of the multiple-spindle lathe provided with the screw-cutting arrangement, parts being shown in section. Fig. 10 shows a part of the head-stock, the bed, and the lengthwise-moving slide-rest on an enlarged scale. Fig. 11 is an end view of the slide-rest, taken from the right-hand side in Fig. 10. Fig. 12 shows, on an enlarged scale, one of the upper tool-spindles in the said slide-rest partly in longitudinal section and partly in elevation. Fig. 13 shows a modified upper tool-spindle partly in longitudinal section and partly in elevation. Fig. 14 is a plan of the bottom cross slide-rest, on an enlarged scale, showing the manner in which it is actuated from the lengthwise-moving slide-rest. Figs. 15 to 17 show diagrammatically the various positions of the parts by which the bottom cross slide-rest is actuated. Fig. 18 is an elevation of the head-stock, the lengthwise-moving slide-rest, the bottom cross-slide, and the top cross-slide of the lathe, on an enlarged scale, to show the manner in which the top cross-slide is actuated. Figs. 19, 20, and 21 show diagrammatically the various positions of the top cross-slide and the parts by which it is actuated. Figs. 22 to 24 will be referred to later on.

Similar letters refer to similar parts throughout the several views.

In the head-stock 16, Fig. 7, the drum 5 is mounted to revolve. It contains four longitudinal holes in which the four chuck-spindles 1, 2, 3, and 4 are fitted to revolve. On the left-hand end of the drum 5 the collar 93 is secured, which is provided with two races for the two series of balls 94 and 95. On these balls the cylinder 6 is arranged to revolve, the balls bearing against the races 96 and 97, respectively, of which the latter is adjustable. The cylinder 6 is cast in one piece with the external gear-wheel 7 and the internal gear-wheel 11, Fig. 8. The external gear-wheel 7 is put into motion from the driving-cone $a$, Fig. 2, by means of the shaft 9, the gear-wheel $b$ on the shaft 9, and the intermediate gear-wheel 8. The internal gear-wheel 11 engages with the pinions 12, 13, 14, and 15, which are mounted loosely upon the four chuck-spindles 1, 2, 3, and 4, respectively. When the pinions are coupled with their chuck-spindles in a manner to be described later on, all the four chuck-spindles will revolve simultaneously and in the same direction. Then the work pieces or blanks held in the chuck-spindles can be acted upon by the tools, which are secured in the respective four tool-spindles arranged in the slide-rest 50, Fig. 1. For example, the blank held in the spindle 1 receives the first cut from the respective tool, while the blanks held in the spindles 2, 3, and 4, respectively, receive the second, third, and fourth cuts from the respective tools. In order to subject the blank held in the spindle 1 and having received the first cut to the action of the second tool, it is necessary to give the drum 5 such a revolution that the spindle 1 comes into the position which the spindle 2 will now occupy, the previous position of the spindle 3 and the latter that of the spindle 4, while the spindle is in the position which the spindle 1 had occupied. In this machine therefore the drum 5 requires to be revolved through an angle of ninety degrees each time to bring the work-piece successively before each of the four tools. The manner in which the drum 5 is put into revolution and again stopped is immaterial, as it can be done in any approved way. It is only essential that the drum 5, carrying the four chuck-spindles, be locked in the head-stock and prevented from revolving around with the cylinder 6 while the blanks are being acted upon by the respective tools and that the drum 5 be released and allowed to partake in the revolution of the cylinder 6 for changing the position of the blanks. In the machine illustrated a horizontal shaft 103, Fig. 1, is transversely mounted in the head-stock to revolve, which shaft carries at the outer end the handle 18 and at the inner end beneath the drum 5 a lever connected with a lock moving horizontally and acting upon the spring-pressed lock 120, arranged to move up and down. Said lock, as shown in detail in Figs. 4 and 5, is engaged by the sliding wedge 123, pivotally connected at 124 with an arm 125, mounted to turn with the handle 18. The lock 120 has a shank 121, surrounded by a spring 122. In the position of the handle 18 shown this lock engages with one of four cams 19, arranged at the periphery of the drum 5, whereby the latter is locked to the head-stock 16. On raising the handle 18 the lock will be withdrawn from the cam 19, whereby the drum is set at liberty and allowed to revolve with the cylinder 6 by reason of the friction between the internal gear-wheel 11 and the four pinions 12 13 14 15 until the lock under the action of a spring or the weight of the handle 18 engages the next cam 19, and thereby stops the drum. The device described for stopping and releasing the drum may be varied, and its particular construction does not form a part of my invention. When the blank, with its chuck-spindle, has passed the four positions indicated and returned to the original position—i. e., that of the spindle 1—it is finished and requires to be replaced with another blank. This is done without stopping the machine in the following manner: Each chuck-spindle has the same construction as the chuck-spindle 3 shown in Fig. 7. The pinion 14, engaging the internal gear-wheel 11, is cast in one piece with the friction-cone 20 and revolves therewith between the set-collars 21 and 22 on the spindle 3. On the latter another friction-cone 24 is mounted to move lengthwise, while it is prevented from turning by a feather or the like. The friction-cone 24 is provided at the left end with several recesses 25 with slanting sides, in which dogs 27 are pivoted at 26. On the spindle 3 a collar 36 is adjustably mounted by means of a thread to regulate the space left for the shifting friction-cone 24. Finally, the sleeve 31, provided with the annular groove 29, is mounted on the spindle 3 to move lengthwise between the adjustable collar 36 and the nut 33. The sleeve takes around the collar 36 and the friction-cone 24 with the dogs 27 and is provided with several recesses or an annular recess 32. The dogs 27 are provided with projecting ends or fingers 28, which project into the recess 32 when the sleeve 31 is moved to the left. In the bearings 99 and 100 of the head-stock 16 the shaft 98 is mounted to move lengthwise. It is connected by the link 101 with the handle 74, pivoted to the head-stock, and carries the fork 30, which is so hollowed out at 102 as to be able to take successively into the grooves 29 of the sleeves 31 on the four spindles 1, 2, 3, and 4, while allowing the respective spindle to rotate with the drum 5 freely. After this explanation of the construction of each of the four chuck-spindles I shall now describe how each chuck-spindle may be set at rest independent of the remaining three spindles, which continue running.

The spindle 1 occupies the position shown in Figs. 7 and 8, in which the fork 30 engages with the groove 29 of the sleeve 31. The pinion 12 (as shown for the pinion 14 in Fig. 7) is coupled with its spindle 1 by reason of the fingers 28 of the dogs 27 being pressed inward by the sleeve 31 and the dogs themselves against the collar 36, whereby the lengthwise-moving friction-cone 24 is pressed against the friction-cone 20 of the pinion 12, (14.) The latter being in engagement with the constantly-revolving internal gear-wheel 11 transmits the revolution to the spindle 1. On moving the handle 74 to the left the fork 30 shifts the sleeve 31 also to the left, so that the fingers 28 of the dogs 27 are set free. Owing to the centrifugal force the dogs 27 will immediately swing outward, so that their fingers 28 engage the annular recess 32 and are thereby taken hold of by the sleeve 31. The latter then by means of the dogs 27 and the bolts 26 forces the friction-cone 24 off the cone 20 of the pinion 12, (14,) whereby the spindle 1 becomes disengaged from the pinion and will soon stop. Thereupon the finished work can be replaced with a fresh blank. On moving the handle 74 again to the right the pinion 12 will be again coupled with its spindle 1 and put the same into rotation.

In lieu of the friction-gear described some other gear of approved design may be employed for putting each chuck-spindle into and out of rotation independently of the other chuck-spindles.

For screw-cutting the machine is provided with the following arrangements. In the center of the drum 5 a shaft 37 is mounted to revolve. It extends from the spindle-stock 16 to the slide-rest 50, Figs. 10 and 11, and carries at the left end a pinion 37ª, (shown in Figs. 2 and 9,) which engages with the pinions 12, 13, 14, and 15 and is driven thereby. At the right hand the shaft 37 carries the gear-wheel 38, which engages the gear-wheel 39, Fig. 11. The latter is connected with the pinion 40, and thereby transmits the motion to the gear-wheel 41, which in its turn engages the pinion 42, running loosely on the sleeve 45 on one top tool-spindle 47, Fig. 12. On the same sleeve the gear-wheel 43 is fastened, which engages the intermediate gear-wheel 44 and by it is connected with the gear-wheel 40. The pinion 42 is cast in one piece with the jaw clutch member 75, Fig. 12. The gear-wheel 43 is larger than the pinion 42 and still larger than the one 44. The consequence of this is that the gear-wheel 43 is driven by the pinion 44 at a slower speed, but the pinion 42 at a quicker speed by the gear-wheel 41. The sizes of these gear-wheels are so determined that the speed of the gear-wheel 43 is smaller than that of the pinion 38—i. e., that of the chuck-spindles. The speed of the pinion 42, on the contrary, is larger than that of the chuck-spindles. The sleeve 45, Fig. 12, runs loosely on the tool-spindle 47 and is cast in one piece with the one jaw clutch member 46. The other jaw clutch member is fastened to the shoulder of the head 48 of the spindle 47. In this head the screw-cutting tool is secured, which will rotate when the sleeve 45 is coupled with the spindle 47 by the said clutch 46. The coupling is effected by shifting the tool-spindle 47 in the direction of the arrow in Fig. 12—i. e., by moving the slide-rest 50 toward the blank, as usual. It is obvious that the screw-cutting tool is revolved in the same direction as the blank, but at a slower speed when the gear-wheel 43 is coupled with the tool-spindle 47, whereby the operation of screw-cutting is rendered possible. At the right end of the tool-spindle 47 the jaw clutch member 49 is secured, which on shifting the tool-spindle 47 in the direction opposed to that of the arrow will engage the other member 75, and thereby couple the pinion 42 with the spindle. Then the screw-cutting tool will revolve still in the same direction, but at a larger speed than that of the blank—i. e., it will return and get off again.

Instead of the jaw-clutches illustrated in Fig. 12 the friction-clutches shown in Fig. 13 may be employed, which require no explanation.

The bottom cross slide-rest, Fig. 14, is fed forward toward the blank in the following manner: In the boss 77, Fig. 18, of the lengthwise-moving slide-rest 50 the rod 78 is arranged to move lengthwise. It is provided with two adjustable stops 79 and 80 and terminates in the sliding piece 81, Fig. 14, which is guided in the bottom part 82 of the cross-slide. The sliding piece 81 is connected by means of the pin 89 to the link 83 and by the pin 90 with the arm 84 of the pinion 85, which latter revolves around the pin 86 and engages the rack 87. The rack 87 is fixed to the tool-slide 76, sliding in the guides 88. In Fig. 14 it is assumed that the tool-slide is to be moved in the direction of the arrow when it is fed forward. At the beginning the parts 81 83 84 occupy about the position shown in Fig. 15. On the lengthwise-moving slide-rest 50 being moved forward either by hand, by means of the spider 91, Figs. 2, 6, and 9, or automatically, the boss 77 will strike against the stop 79 and move the rod 78 forward in the direction of the arrow—say for a length equal to $a$ in Fig. 16. Thereby the pinion 85 will be rotated through the angle $a$, and the rack 87 will be moved in the direction of the arrow by a length equal to A. This means that the tool-slide 76, with the tool, will be fed forward toward the blank by the amount of A. On moving the rod 78 farther by a like length $b$ equal to $a$, Fig. 17, the pinion 85 will be rotated only through the angle B, which is smaller than the previous angle $x$. Hence also the rack 87, and with it the cross tool-slide 76, will be fed forward only through the distance of B in spite of the fact that the rod 78 has been moved through the same distance as before. Thus the feed of the tool is constantly diminishing. On the various parts attaining the position shown in Figs. 14 and 17 it will be possible to reverse the motion of the tool-slide 76 by moving the slide-rest 50 back to the right-hand side. Then the boss 77 will strike against the other stop 80 and move the rod 78 in the opposite direction. The same motion of the tool-slide, however, may be also attained by moving the slide-rest 50 farther toward the head-stock, so that the pin 89 proceeds beyond the straight line of the parts 83 and 81. (Shown in Fig. 17.) In this case the feed of the tool-slide (in a direction opposed to that the arrow in Fig. 14) will constantly increase. It is obvious that the arrangement described may be so altered as to constantly increasing the feed of the cross slide-rest. It is easy to so adjust the parts 83 and 84—i. e., the angle $x$—as to obtain a total feed of the tool of a certain distance. The stops 79 and 80 on the rod 78 require to be adjusted accordingly. The arrangement for actuating the cross slide-rests from the lengthwise-moving slide-rest 50 may be varied as long as there is employed mechanism operating in such a manner that while the lengthwise-moving slide-rest 50 is fed forward at a uniform speed the cross slide-rests are fed forward at a constantly diminishing or increasing speed. The upper cross slide-rest is in a similar manner actuated from the lengthwise-moving slide-rest 50. The latter is provided at its top with a boss 51, Fig. 18, in which the rod 54 is mounted to move lengthwise. The rod 54 is provided with the two adjustable stops 52 and 53 and extends through the guide 110 for the tool-slide, Figs. 18 to 21. On the head-stock 16 the guide 74 is fastened, in which the slide 56 is arranged to slide lengthwise. The slide 56 is made in one piece with the said guide 110 and is itself formed as a guide, in which the end 55 of the said rod 54 slides. This end 55 is connected by means of the link 57 with the two-armed lever 60, which latter swings around the pin 58, located on the guide 110. The other arm 59 is arranged to swing within a slot of the guide 110 and engages in a recess 112 of the slide 61, so that on moving the lever 60 up and down the slide 61 will thereby be moved downward and upward, respectively. The angle through which the lever 60 may be moved is limited by a wall of the said slot in the guide 110 and by an adjustable stop of any approved kind arranged at the back of the guide 110 for striking against the slide 61. On the slide 61 the tool-slide 111 is arranged to slide. By the screw-spindle 114, secured in the projection 113 of the slide 61, the tool-slide 111 is connected with the slide 61. Thus by the screw-spindle 114 the tool 62, secured in the tool-slide 111, may be adjusted. On the head-stock 16 the boss 65 is provided, in which the rod 66 is arranged to move lengthwise, while by the feather 67, engaging a recess in the boss 65, it is prevented from turning. The rod 66 is provided with collars 68, 69, 70, and 71, separate therefrom, of which the outer ones, 68 71, are adjustably secured on the rod by set-screws, while the inner ones, 69 70, are freely movable and are adapted to abut against the feather 67. Between the collars 68 and 69 the spiral spring 72 is arranged and between the collars 70 and 71 the spiral spring 73. The feather 67 has the same length as the boss 65, and the collars 68 and 71 are so adjusted as to give the spiral springs 72 and 73 a certain tension, so that they press the collars 69 and 70 against the boss. On drawing the rod 66 out to the right, Fig. 21, the tension of the spring 73 will have to be overcome, while the feather 67 takes the collar 69 along and prevents the spring 72 from acting. On releasing the rod 66 it will be returned to its original position by the spring 73. On the other hand, on drawing the rod 66 out to the left, Fig. 19, in a similar manner the tension of the spring 72 will have to be overcome, while the feather 67 prevents the spring 73 from acting. On releasing the rod 66 the spring 72 will bring the rod 66 back to its middle position. The end 64 of the rod 66 is adjustable in the guide 56 and there secured by the screws 63 63. Thus the guide 61, the guide 56, and the rod 66 are rigidly connected and move together lengthwise. Fig. 19 shows the lever 60 in the uppermost position, so that on moving the rod 54 to the left the tool 62 cannot move downward. On moving the rod 54 to the right the lever 60 will by the link 57 be moved downward, as is illustrated by the Figs. 20 and 21, it being shown in about the middle position in Fig. 20 and in the lowest position in Fig. 21. In the latter case the tool 62 cannot move farther upward.

I will now explain the manner in which the upper cross-slide is actuated by the lengthwise-moving slide-rest 50.

Supposing that during the forward motion of the slide-rest 50 toward the head-stock the tool 62 is to be given, first, a lengthwise motion through the distance $m$, Fig. 22, in the direction of the arrow, then a downward motion through the distance $n$, and afterward again lengthwise through the distance $o$. Then the stop 53 on the rod 54 is so adjusted as to draw the rod 66 out of its middle position to the right through the distance $m$, Fig. 21, when the slide-rest 51 is brought into that position where it shall commence to actuate the cross tool-slide. Afterward the stop at the back of the guide 110 is so adjusted as to give the slide 61, with the tool-slide 110 and the tool, a stroke equal to $n$ during the motion of the slide-rest 50 through a path that depends upon the circumstances. Then the stop 52 is so adjusted on the rod 54 as to draw the rod 66 out of its middle position to the left through the distance $o$, Fig. 19, when the slide-rest 50 is being brought into the position where it shall stop. Now it will be evident that the tool 62 will describe the path $m$ $n$ $o$ in Fig. 22. For the initial position of the slide-rest 50 the tool 62 occupies the position A in Fig. 22 and the parts connected therewith occupy the position shown in Fig. 21. On moving the slide-rest 50 through the distance $m$ it will exercise no influence upon the tool 62, since the spring 73 will move the rod 66, with the guides 56 and 61, to the left, while holding the lever 60 in the lowest position until the rod 66 attains its middle position and the tool arrives at B. From this moment on further moving the slide-rest 50 the latter will by the rod 54, the link 57, and the lever 60 move the tool-slide, with the tool 62, downward through the distance $n$ from B to C. Then on moving the slide-rest 50 farther it will exercise no influence upon the tool 62, but simply move the rod 54, with the lever 60, and the guides 110 and 56, the rod 66, and the tool 62 through the distance $o$ from C to D. It is now easy to recognize how the stops 52 and 53 and that at the guide 110 should be adjusted to obtain various motions of the tool and to adjust the lengths of such movements. The stops may be so adjusted as to give the tool 62 first a lengthwise motion (represented by $m$, Fig. 23) and then a side motion, (represented by $n$,) or they may be so adjusted as to give the tool first a side motion of an extent equal to $n$, Fig. 24, and then a lengthwise motion equal to $o$. If the upper cross tool-slide is not to be actuated, the stops 52 53 need only be so adjusted as to leave the rod 54 undisturbed.

My machine thus described affords several important practical advantages. The manner in which the series of chuck-spindles arranged in the revolving drum may be each put into and out of rotation independently of the others is highly advantageous. The driving-gear for actuating the chuck-spindles and the drum carrying same is arranged on the left-hand side of the lathe, so that the right-hand side of the latter is entirely free for handling the tool-slide rests. Also the driving-gear for actuating the screw-cutting tool, which is rendered possible by the special driving-gear for actuating the chuck-spindles and the drum carrying same, is of special advantage for the working of the lathe, owing to the great simplicity of the arrangement, so that it can be easily attended to. The transmission of the motion of the lengthwise-moving slide-rests to the several cross tool-slides is also of special importance for the arrangement and driving of the lathe having a plurality of spindles, while the great advantage of the cross tool-slides being fed at a constantly diminishing or increasing speed is of no less importance.

The machine illustrated is provided with four chuck-spindles and as many tool-spindles. In the machine shown in Fig. 6 preferably only three tools are held in the tool-spindles, since during the working of these tools the finished work must be taken off the chuck-spindle opposed to the fourth tool-spindle and replaced by a fresh blank. The machine may, however, be arranged to receive more or less than four chuck-spindles and four tool-spindles. It is not essential that the number of the tool-spindles arranged in the lengthwise-moving slide-rest be equal to that of the chuck-spindles. In every case it is sufficient to arrange the tools that the blanks held in the various chuck-spindles may be acted upon simultaneously by the several tools and successively by the same tool.

It is not essential to employ all the various arrangements described on the same multiple-spindle lathe. For example, the cross tool-slides actuated in the described manner by the lengthwise-moving slide-rest may be omitted or replaced with cross tool-slides actuated in any approved manner. The screw-cutting tool may also be omitted.

It is not absolutely necessary that the screw-cutting device be driven by a shaft extending from the head-stock; but it may be driven direct from without—say from the counter-shaft. Further, it is not necessary that the driving-cylinder be provided with external gear-teeth, as it may, for instance, be formed on the outside as a belt-pulley and arranged to be driven by a counter-shaft.

What I claim as my invention, and desire to secure by Letters Patent, is—

1. In a multiple-spindle lathe, the combination with the head-stock having a horizontal bore, of a drum adapted to revolve in said bore of the head-stock and provided with a plurality of longitudinal bores arranged around the center line, a like plurality of chuck-spindles mounted in said horizontal bores to revolve, a cylinder mounted on said drum to revolve and provided with external and internal gear-teeth, a series of gear-wheels engaging said external gear-teeth and arranged to be driven by a belt-cone, the said chuck-spindles having each a pinion running loosely and engaging said internal gear-teeth of the cylinder, means for coupling each of said chuck-spindles with its pinion and holding it disconnected independently of the other chuck-spindles which continue turning, means for stopping said drum during the work of the tools and releasing it to change the position of said chuck-spindles, a lengthwise-moving slide-rest arranged on the lathe-bed and provided with a plurality of tool-spindles in the direction and in opposition to said chuck-spindles and means for actuating same, so as to subject the blanks held in said chuck-spindles successively to the various tools held in said tool-spindles, substantially as set forth.

2. In a multiple-spindle lathe, the combination with the head-stock, of a horizontal drum mounted in said head-stock to revolve and provided with a plurality of revoluble chuck-spindles arranged parallel to and around the center line of said drum a cylinder mounted on said drum to revolve and provided with external and internal gear-teeth, series of gear-wheels engaging said external gear-teeth and arranged to be driven by power, the said chuck-spindles having each a pinion running loosely and engaging said internal gear-teeth of the cylinder, means for coupling each of said chuck-spindles with its pinion and again releasing same independently of the other chuck-spindles which continue running, means for stopping and releasing said drum to change the positions of said chuck-spindles, a slide-rest arranged on the lathe-bed to move lengthwise and provided with a plurality of tool-spindles in alinement with and in opposition to said chuck-spindles, means for actuating the tool-spindles, so as to subject the work-pieces held in said chuck-spindles successively to the various tools held in said tool-spindles, a number of tool-slides arranged to slide in directions at right angles to the drum-axis, means for supporting and guiding said cross tool-slides, and means for connecting said cross tool-slides positively with said lengthwise-moving slide-rest so that on the latter being moved in a certain direction the said cross-slides will be moved in various directions, substantially as set forth.

3. In a multiple-spindle lathe the combination with the head-stock, of a horizontal drum mounted therein to revolve and provided with a plurality of chuck-spindles arranged parallel to and around the center line of said drum to revolve and provided with external and internal gear-teeth, a series of gear-wheels engaging said external gear-teeth and arranged to be driven by power, the said chuck-spindles having each a pinion running loosely and engaging said internal gear-teeth of the cylinder, means for coupling each of said chuck-spindles with its pinion and again releasing same independently of the other chuck-spindles which continue running, means for stopping and releasing said chuck-spindles, a slide-rest arranged on the lathe-bed to move lengthwise and provided with a plurality of tool-spindles in alinement with and in opposition to said chuck-spindles one of said tool-spindles being arranged for screw-cutting in moving lengthwise, a shaft mounted in the center of said drum and extending through said lengthwise-moving slide-rod, a gear-wheel secured on one end of said shaft and engaging said pinions on said chuck-spindles, whereby the shaft is driven, two gear-wheels arranged on said screw-cutting tool-spindle, a series of gear-wheels for transmitting the revolution of said shaft to said two gear-wheels at different speeds, and means for engaging said screw-cutting tool-spindle with one of said two gear-wheels for screw-cutting and with the other gear-wheel for withdrawing the screw-cutting tool, while in both cases running in the same direction as the blank, substantially as set forth.

4. In a multiple-spindle lathe, the combination with the head-stock, of a horizontal drum mounted in said head-stock to revolve and provided with a plurality of longitudinal bores arranged around the axis of the drum, a like plurality of chuck-spindles mounted in said horizontal bores to revolve, a ring fastened on the outside of said drum to secure it against shifting lengthwise in said head-stock and provided with two races for two series of balls, a cylinder mounted on said two series of balls to revolve, means for adjusting said balls in their races, the said cylinder being provided with external and internal gear-teeth, a gear-wheel engaging said external gear-teeth and arranged to be driven by power, the said chuck-spindles having each a pinion running loosely and engaging said internal gear-teeth of the cylinder, means for coupling each of said chuck-spindles with its pinion and again disengaging same independently of the other chuck-spindles which continue running, means for stopping and releasing said drum, to change the position of said chuck-spindles, a slide-rest arranged on the lathe-bed to move longitudinally and provided with a plurality of tool-spindles in alinement with and in opposition to said chuck-spindles, and means for actuating the tool-spindles, so as to subject the blanks held in said chuck-spindles successively to the action of the various tools held in said tool-spindles, substantially as set forth.

5. In a multiple-spindle lathe, the combination with the head-stock, of a horizontal drum mounted in said head-stock to revolve and provided with a plurality of longitudinal bores arranged around the axis of the drum, a like plurality of chuck-spindles mounted in said horizontal bores to revolve, a ring fastened on the outside of said drum to secure it against shifting lengthwise in said head-stock and provided with two races for two series of balls, a cylinder mounted on said two series of balls to revolve, means for adjusting said balls in their races, the said cylinder being provided with external and internal gear-teeth, a gear-wheel engaging said external gear-teeth and arranged to be driven by power, the said chuck-spindles having each a pinion running loosely and engaging said internal gear-teeth of the cylinder, means for coupling each of said chuck-spindles with its pinion and again disengaging same independently of the other chuck-spindles which continue running, means for stopping and releasing said drum to change the position of said chuck-spindles, a slide-rest arranged on the lathe-bed to move longitudinally and provided with a plurality of tool-spindles in alinement with and in opposition to said chuck-spindles, means for actuating the tool-spindles, so as to subject the blanks held in said chuck-spindles successively to the action of the various tools held in said tool-spindles, a number of tool-slides arranged to slide in directions at right angles to the drum-axis, means for supporting and guiding said cross tool-slides, and means for connecting said cross tool-slides positively with said longitudinally-moving slide-rest, so that on the latter being moved in a predetermined direction, the cross-slides will be moved in various directions, substantially as set forth.

6. In a multiple-spindle lathe, the combination with the head-stock, of a horizontal drum mounted therein to revolve and provided with a plurality of longitudinal bores arranged around the axis of the drum, a like plurality of chuck-spindles mounted in said horizontal bores to revolve, a cylinder mounted on said drum to revolve and provided with external and internal gear-teeth, a gear-wheel engaging said external gear-teeth and arranged to be driven by power, the said chuck-spindles having each a pinion running loosely and engaging said internal gear-teeth of the cylinder, means for coupling each of said chuck-spindles with its pinion and again disengaging same independently of the other chuck-spindles which continue running, means for stopping and releasing said drum to change the positions of said chuck-spindles, a slide-rest arranged on the lathe-bed to move longitudinally and provided with a plurality of tool-spindles in alinement with and in opposition to said chuck-spindles, one of said tool-spindles consisting of a hollow shaft and of a screw-cutting tool-spindle, said hollow shaft being mounted in said slide-rest to revolve and provided at both ends with clutch members, and said screw-cutting tool-spindle being mounted in said hollow shaft to revolve and to shift endwise, and provided with clutch members for engaging alternately the clutch members of said hollow shaft, a shaft mounted in the center of said drum and extending through said slide-rest, a gear-wheel secured on one end of said shaft and engaging said pinions on said chuck-spindles, whereby the shaft is driven, two gear-wheels secured on said hollow shaft, a series of gear-wheels for transmitting the revolution of said shaft to said two gear-wheels at different speeds, so that on moving said slide-rest toward the blank running in one direction the blank will shift said screw-cutting tool-spindle and bring it by means of said hollow shaft into gear with one of said two gear-wheels, whereupon it will be driven in the same direction but at a slower speed for screw-cutting, while on moving said slide-rest back the blank will shift said screw-cutting tool-spindle in the opposite direction and bring it by means of said hollow shaft into gear with the other of said two gear-wheels, whereupon it will be driven in same direction, but at a greater speed, for returning from the blank, substantially as set forth.

7. In a multiple-spindle lathe, the combination with the head-stock, of a horizontal drum mounted therein to revolve and provided with a plurality of longitudinal bores arranged around the axis of the drum, a like plurality of chuck-spindles mounted in said horizontal bores to revolve, a cylinder mounted on said drum to revolve and provided with external and internal gear-teeth, a gear-wheel engaging said external gear-teeth and arranged to be driven by power, the said chuck-spindles having each a pinion running loosely and engaging said internal gear-teeth of the cylinder, means for coupling each of said chuck-spindles with its pinion and again disengaging same independently of the other chuck-spindles which continue running, means for stopping and releasing said drum to change the positions of said chuck-spindles, a main slide-rest arranged on the lathe-bed to move longitudinally and provided with a plurality of tool-spindles in alinement with and in opposition to said chuck-spindles, an adjustable slide mounted on the lathe-bed between said head-stock and said main slide-rest, a cross tool-slide mounted on said adjustable slide to move across the lathe-bed, a rack mounted in said adjustable slide to move across the lathe-bed, adjustable means for connecting said cross tool-slide with said rack, a pinion mounted on said adjustable slide and engaging said rack, an arm connected rigidly with said pinion, a link connected at the one end to said arm, a sliding piece mounted in said adjustable slide to move longitudinally and connected with the other end of said link, said main slide-rest being provided with a boss in alinement with said sliding piece, a rod mounted in said boss to move longitudinally and connected with said sliding piece, two adjustable stops mounted on said rod on both sides of said boss, so that on moving said main slide-rest in one direction, its boss will strike at a certain moment against one of said adjustable stops and take said rod along with it, whereupon said cross tool-slide will be moved in one direction at a varying speed in accordance with the motion of said arm, substantially as set forth.

8. In a lathe, the combination with the head-stock, of a main slide-rest arranged on the lathe-bed to move longitudinally and provided with a boss, an adjustable slide mounted on the lathe-bed, a cross tool-slide mounted on said adjustable slide to move crosswise, a lever pivoted on said adjustable slide, adjustable means for connecting said lever positively with said cross tool-slide, a rod mounted in said boss of said main slide-rest to move longitudinally, adjustable stops mounted on said rod, and means for connecting said rod with said lever, so that on moving said main slide-rest in one direction, its boss will strike at a certain moment against one of said adjustable stops and take said rod along with it, whereupon said cross tool-slide will be moved in one direction at a varying speed in accordance with the motion of said lever, substantially as set forth.

9. In a lathe, the combination with the head-stock, of a spindle mounted in said head-stock to revolve, means for driving said spindle, a slide-rest arranged on the lathe-bed to move longitudinally and provided with a longitudinal bore in alinement with and in opposition to said spindle, a hollow shaft mounted in said longitudinal bore to revolve and provided at both ends with clutch members, a screw-cutting tool-spindle mounted in said hollow shaft to revolve and to shift endwise and provided with clutch members for engaging alternately the clutch members of said hollow shaft, a shaft mounted in said head-stock and extending through said slide-rest, a gear-wheel secured on one end of said shaft, means for transmitting the revolution of said spindle to said gear-wheel, two gear-wheels secured on said hollow shaft, and a series of gear-wheels for transmitting the revolution of said shaft to said two gear-wheels at different speeds, so that on moving said slide-rest toward the blank held in said spindle the blank will shift said screw-cutting tool-spindle and bring it by means of said hollow shaft into gear with one of said two gear-wheels, whereupon it will be driven in same direction, but at a slower speed for screw-cutting, while on moving said slide-rest back the blank will shift said screw-cutting spindle in the opposite direction and bring it by means of said hollow shaft into gear with the other of said two gear-wheels, whereupon it will be driven in same direction, but at an increased speed for returning from the blank, substantially as set forth.

10. In a lathe, the combination with the head-stock, of a spindle mounted in said head-stock to revolve, means for driving said spindle, a slide-rest arranged on the lathe-bed to move longitudinally and provided with a longitudinal bore in alinement with and in opposition to said spindle, a tool-spindle mounted in said longitudinal bore to revolve and to shift endwise and arranged for screw-cutting during its lengthwise movement, a shaft mounted in said head-stock and extending through said slide-rest, means for transmitting the revolution of said spindle to said shaft, two gear-wheels arranged on said screw-cutting tool-spindle, a series of gear-wheels for transmitting the revolution of said shaft to said two gear-wheels at different speeds, and means for bringing said screw-cutting spindle into gear with one of said two gear-wheels for screw-cutting and with the other gear-wheel for withdrawing the screw-cutting tool while in both cases running in the same direction as the blank, substantially as set forth.

11. In a lathe, the combination with the head-stock, of a longitudinal guide affixed thereto, a slide mounted to move in said longitudinal guide and formed as a guide, a sliding piece mounted in said guide on said longitudinal slide to move longitudinally, a main slide-rest arranged on the lathe-bed to move longitudinally and provided with a boss in alinement with and in opposition to said sliding piece, a rod mounted in said boss to move longitudinally and connected with said sliding piece, adjustable stops mounted on said rod, a cross-guide connected rigidly with said longitudinal slide, a cross tool-slide mounted in said cross-guide to move, a two-armed lever fulcrumed on said cross-guide and having one of its arms in engagement with said cross tool-slide, a link connecting the other arm of said lever with said sliding piece, means for adjusting the stroke of said cross tool-slide, a second rod mounted in a boss on the head-stock to move longitudinally and secured adjustably to said longitudinal slide, said second rod having a feather of a length equal to that of said boss and engaging a recess in the boss, two loose collars and two adjustable set-collars mounted on said second rod on both sides of said boss, two compressible coiled springs arranged between said loose collars and said adjustable set-collars, the said springs being compressed by said set-collars and pressing said loose collars against said feather, so that, on moving said main slide-rest in one direction, it will by means of one of said adjustable collars take said rod along with and move said cross tool-slide in one direction across, until the latter is stopped by said adjusting means, whereupon said cross tool-slide with said cross-guide, said longitudinal slide and said second rod is moved longitudinally, one of said springs being compressed, while upon moving said main slide-rest back, said parts are first moved longitudinally in the opposite direction by said compressed spring, whereupon by means of said two-armed lever said cross tool-slide is moved crosswise in the opposite direction by said rod and the other of said adjustable collars, substantially as set forth.

12. In a lathe, the combination with the head-stock, of a cross-guide, means for supporting said cross-guide and guiding same longitudinally, means for returning said cross-guide, on its being released, to a middle position, a cross tool-slide mounted to move in said cross-guide, a lever fulcrumed upon said cross-guide and engaging said cross tool-slide, means for adjusting the stroke of said cross tool-slide, a main slide-rest arranged on the lathe-bed to move longitudinally and provided with a boss, a rod mounted in said boss to move longitudinally, adjustable stops mounted on said rod, and operating means for connecting said rod positively with said lever, so that on moving said main slide-rest in one direction, it will by means of one of said adjustable stops take said rod along with it and move said cross tool-slide across in one direction, until the latter is stopped, whereupon said cross tool-slide with said cross-guide is moved longitudinally, while upon moving said main slide-rest back said parts are first moved longitudinally in the opposite direction by the return of said operating means, whereupon said cross tool-slide is moved in the opposite direction across by said rod and the other of said adjustable stops, substantially as set forth.

13. In a lathe, the combination of a revoluble drum, a cylinder mounted to revolve on one end of the drum and provided with an internal gear, means for revolving the cylinder, a plurality of chuck-spindles mounted in the drum, gear-wheels loosely mounted on the chuck-spindles and meshing with the internal gear of the cylinder, said gear-wheels each carrying a clutch member, a second clutch member movably mounted on each spindle and adapted to engage the clutch member of the said gear-wheel to lock the gear-wheel to the spindle, and means for operating the movable clutch members, as set forth.

14. In a lathe, the combination of a revoluble drum, a cylinder mounted to revolve on one end of the drum and provided with an internal gear, means for revolving the cylinder, a chuck-spindle mounted in the drum, a gear-wheel loosely mounted on the chuck-spindle and meshing with the internal gear of the cylinder, said gear-wheel carrying a friction-cone, a second friction-cone movably mounted on the spindle and adapted to engage the cone of the gear-wheel, said movable friction-cone being provided with recesses, dogs pivoted in the recesses, a sliding sleeve mounted on the spindle, said sleeve extending over the movable cone and adapted to be engaged by the dogs, and means for operating the sleeve, as set forth.

15. In a lathe, the combination of a revoluble drum, a cylinder mounted to revolve on one end of the drum and provided with an internal gear, means for revolving the cylinder, a chuck-spindle mounted to revolve in the drum, a gear-wheel loosely mounted on the spindle and meshing with the internal gear of the cylinder, said gear-wheel carrying a friction-cone, a second friction-cone mounted to slide between collars on the spindle, said second friction-cone being provided with recesses having slanting sides, dogs pivoted in the recesses and having projecting ends or fingers, a sleeve mounted to slide on the spindle and extending over the movable cone, said sleeve being provided with a recess to receive the ends or fingers of the dogs, and means for operating the sleeve, as set forth.

16. In a lathe, the combination with a revoluble drum, a plurality of chuck-spindles mounted in the drum, and means for operating the said spindles, of a slide-rest, a plurality of tool-spindles carried by the slide-rest, and mechanism for operating one of the tool-spindles from the chuck-spindles, as set forth.

17. In a lathe, the combination with a revoluble drum, a plurality of chuck-spindles mounted in the drum, and means for operating the said spindles, of a slide-rest, a plurality of tool-spindles carried by the rest, a shaft mounted in the drum and geared at one end with the chuck-spindles, and gearing between the other end of the shaft and one of the tool-spindles, whereby the tool-spindle will be driven during the cutting operation at less speed than the chuck-spindles and at a greater speed than the chuck-spindles upon the withdrawal of the cutting-tool, as set forth.

18. In a lathe, the combination with a revoluble drum, a plurality of chuck-spindles mounted in the drum, and means for operating the chuck-spindles, of a slide-rest, a plurality of tool-spindles carried by the rest, two gear-wheels on one of the tool-spindles, a shaft mounted in the drum and geared at one end with the chuck-spindles, and a series of gears for transmitting the revolution of said shaft to the said two gear-wheels at different speeds, as set forth.

19. In a lathe, the combination with a revoluble drum, a revoluble cylinder mounted on the drum and provided with an internal gear, chuck-spindles mounted in the drum, and gear-wheels on the spindles and meshing with the internal gear of the cylinder, of a slide-rest, a plurality of tool-spindles carried by the rest, two gear-wheels on one of the tool-spindles, a shaft mounted in the drum, a gear-wheel on the shaft and meshing with the gear-wheels of the chuck-spindles, and a series of gears for transmitting the revolution of the said shaft to the said two gear-wheels at different speeds, as set forth.

20. In a lathe, the combination of a revoluble drum, a revoluble cylinder mounted on the drum and provided with an internal gear, chuck-spindles mounted in the drum, gear-wheels loose on the spindles and meshing with the internal gear of the cylinder, clutches for locking the gear-wheels to the spindles, a slide-rest, a plurality of tool-spindles carried by the rest, two gear-wheels on one of the tool-spindles, a shaft mounted in the drum, a gear-wheel on the shaft and meshing with the gear-wheels of the chuck-spindles, and a series of gears for transmitting the motion of the shaft to the said two gear-wheels on the tool-spindle, at different speeds, as set forth.

21. In a lathe, the combination of a slide-rest, a plurality of tool-spindles carried by the rest, two gear-wheels on one of the spindles, a driven shaft, and a series of gears for transmitting the motion of the shaft to the said two gears at different speeds, as set forth.

FRANK HIRSCH.

Witnesses:
H. VON HIDINBERG.
WILH. JENKEL.